Nov. 18, 1952 D. B. McCAULLEY 2,618,176
SAW FILER
Filed March 27, 1950 2 SHEETS—SHEET 1
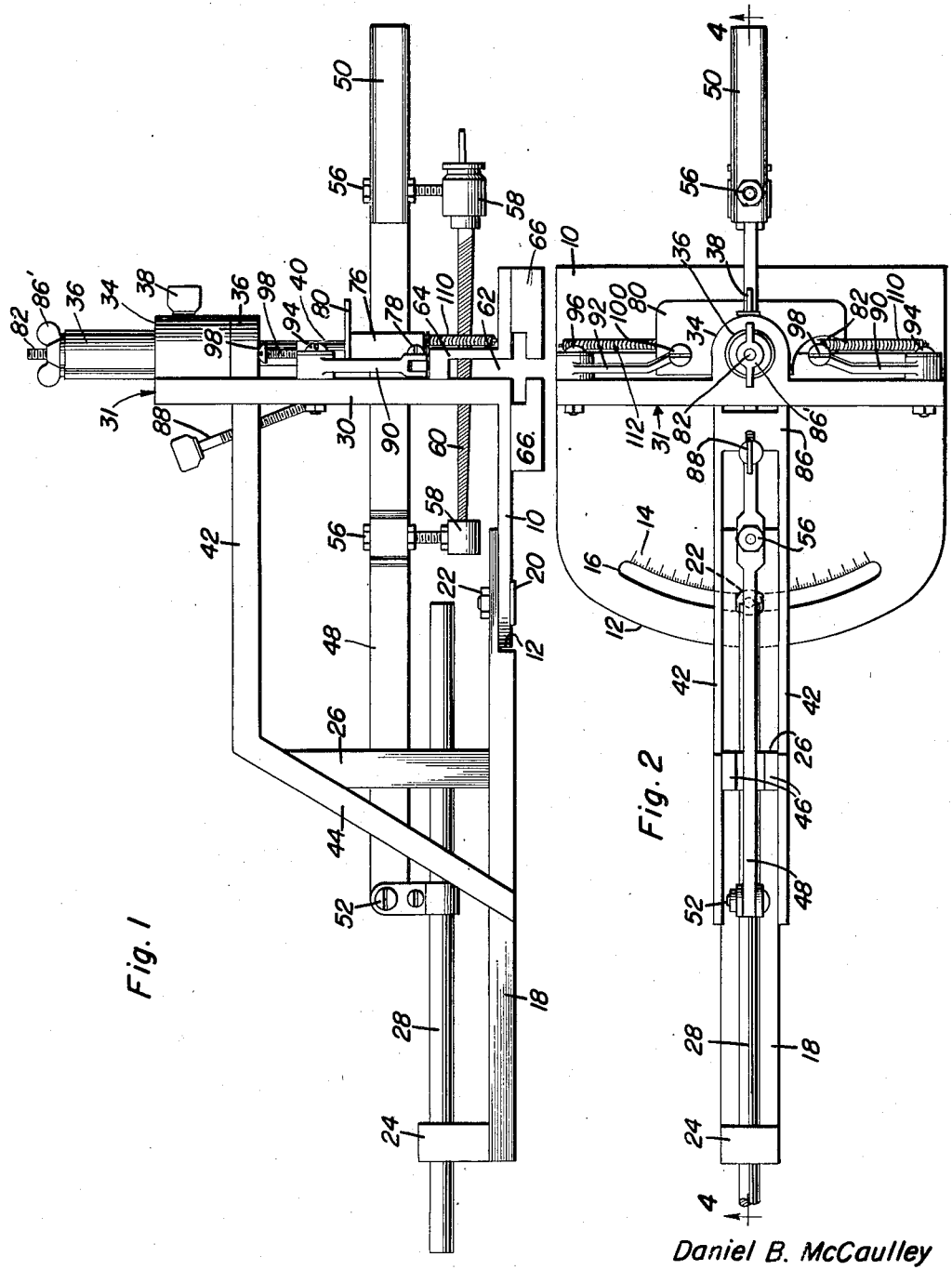
Daniel B. McCaulley
INVENTOR.
BY *Clarence A. O'Brien
and Harvey B. Jacobson*
Attorneys

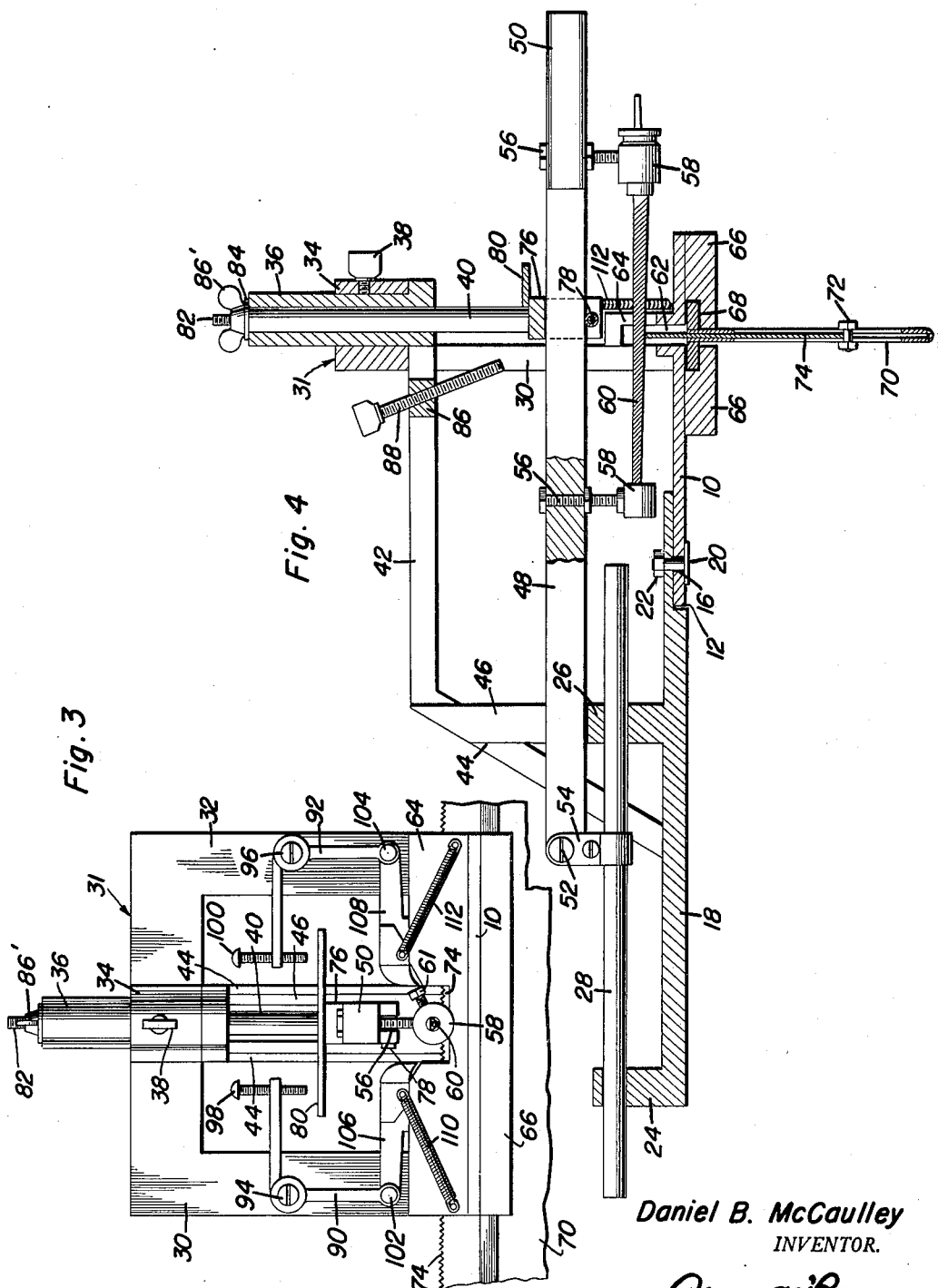

Patented Nov. 18, 1952

2,618,176

UNITED STATES PATENT OFFICE 2,618,176

SAW FILER

Daniel B. McCaulley, Pueblo, Colo.

Application March 27, 1950, Serial No. 152,166

7 Claims. (Cl. 76—35)

This invention relates to a manually operable machine for filing the teeth of hand saws, and has for its primary object to simplify the filing operation.

An important object of this invention is to provide a manually operable saw filing machine which includes a means for manually reciprocating a file across the teeth of a hand saw and a means for raising and lowering the file in such a manner that pawls are selectively actuated to engage the saw teeth and push the hand saw stepwise across the machine in a forward and reverse direction transversely of the machine.

A further object of this invention is to provide a saw filing machine of the character described including an adjustable means for varying the stroke of the pawls and a means for limiting the upward and downward movement of the file relative to the hand saw being repaired.

Yet another important object of this invention is to provide a saw filing machine of the character described which includes a reciprocable carriage carrying the file which can be adjustably mounted upon a frame to vary the inclination of the file with respect to the saw teeth.

These, together with various ancillary objects and features of the invention which will later become apparent as the following description proceeds, are attained by the device, a preferred embodiment of which has been illustrated by way of example only in the accompanying drawings, wherein:

Figure 1 is a side elevational view of the device;

Figure 2 is a top plan view of the device;

Figure 3 is an end elevational view of the device looking from the right of Figure 1; and Figure 4 is a sectional view taken substantially on the plane of section line 4—4 of Figure 2.

Briefly stated and by way of general introduction to the following detailed description, it will be seen that the preferred structural adaptation is characterized by a base plate having a saw accommodating slot and means beneath the plate to movably support the saw blade in filing alignment with the slot. A vertical arch-shaped frame is attached to and rises perpendicularly from the base plate in approximate alignment with the slot. There is a bearing on the bight portion of the frame in which the sleeve is turnable and vertically adjustable, said sleeve constituting a bushing for a vertical shaft or spindle to the lower end of which the saw carriage means is slidably connected. The carriage embodies a reciprocable bar carrying the file and is hinged to a clamp on a guide rod which is slidable on a plate, the plate being in a plane with and adjustably mounted on the base plate. Other specific structural details will be hereinafter clarified.

Specific reference will now be made to the drawings. In the several views, in the accompanying drawings and in the following specification, similar reference characters indicate corresponding elements throughout.

The present device is fabricated of suitable metals, wood and the like, and includes a relatively flat base member 10 having an arcuate forward edge 12 including graduations 14 cooperating with an arcuate slot 16 adjacent this edge. An elongated plate 18 is provided which is apertured adjacent one of its ends to receive a headed bolt 20 which also extends through the arcuate slot 16 and receives a closure nut 22. Thus, it will be seen that the plate is horizontally pivotal upon the base member 10 and can be retained in any desired angular position thereon by tightening the nut 22, as will be readily understood. The free end of the plate 18 includes a vertically extending, apertured lug or bearing member 24 and another vertically extending lug 26 adjacent its pivoted end which is also apertured, a guide rod 28 being provided which is in spaced parallelism above plate 18 and is slidable in the apertured lugs or bearings 24 and 26.

Secured to the base member 10 is a vertical connected U-shaped frame or arch 31 embodying a pair of vertically extending frame members 30 and 32, the bight portion of said U-shaped frame having a centrally disposed vertically extending bearing 34 secured thereto in which is received a vertically extending sleeve or bushing 36, the latter and bearing 34 being secured to each other by means of a set screw 38. Vertically slidable in the sleeve 36 is a shaft 40 for a purpose later to be described. Integral with the bearing 34 is a pair of horizontally extending bars 42 which are in turn secured at their free ends by inclined brace bars 44 to the pivotally mounted plate 18. The inclined brace bars 44 are also in turn secured to the apertured lug 26 as shown clearly at 46.

A bar 48 is provided which extends longitudinally between the brace bars 44 and the frame members 30 and 32 and includes a handle 50 at one end thereof. At its other end, the bar 48 is pivoted for vertical movement as at 52 to a clamp 54 which embraces and is secured to the rod 28 between the apertured bearing lugs 24 and 26 as shown clearly in the drawings. Thus, it will be seen that the bar 48 may be longitudinally reciprocated within the frame and may also be raised and lowered about the pivot pin 52. Secured as by appropriate screws and nuts 56 to the bar 48 is a pair of collars 58 between which is supported an appropriate triangular file 60. The rearmost collar 58 includes a set screw 61, see Figure 3, for rotatably adjusting the file 60 within the bearing collars 58.

The base member 10 includes a transversely extending slot 62 adjacent the L-shaped frame members 30 and 32, the base member including L-shaped guides 64 which are secured to the vertical legs of the L-shaped members 30 and 32. Secured to the under surface of the base member 10 is a pair of transversely extending blocks 66 forming therebetween a guide groove 68 underlying the transverse slot 62 for slidably and guidingly receiving a carrier plate 70 in which is secured, as at 72, a saw 74 which extends through the transverse slot 62 and into the guides 64 beneath the file 60 which may be manually moved to and fro across the saw teeth, as shown clearly in Figure 4. Inasmuch as the bar 48 carrying the longitudinally extending file 60 may be raised and lowered by the handle 50 relative to the supported saw 74, a means is provided in response to the raising of the bar 48 for urging the saw in a stepwise manner through the transverse slot 62 selectively in a forward and reverse direction by the following means. The shaft 40 carries a fork 76 at its bottom end which straddles the bar 48, the legs of the bifurcated member being secured together by means of an appropriate screw 78. Secured to and extending longitudinally from the U-shaped member 76 is a transversely extending platform 80. One end of the platform 80 includes an arcuate slot 82 for a purpose soon to appear. Thus, when the handle 50 is raised and lowered, the shaft 40 is in turn raised and lowered through the collar 36, the upper end of the shaft being threaded as at 82 to receive a washer 84 and an adjustable closure nut 86', the latter elements serving as an adjustable stop limiting the downward movement of the shaft 40. To limit the upward movement of the shaft and consequently the stroke of the bar 48, a bar 86 is secured transversely between the pair of horizontal bars 42 and includes an angular, internally threaded bore for receiving an externally threaded set screw 88 which is adapted at its lower end to abut the bar 48 upon upward movement of the latter, as will be readily understood.

With particular reference to Figure 3, it will be seen that a pair of bellcrank levers 90 and 92 are provided which are pivoted at their corners, as at 94 and 96, respectively, to the L-shaped frame members 30 and 32 for vertical movement thereon. The horizontal leg portions of the bellcranks are provided with adjustment screws 98 and 100 which can be moved toward or away from the platform 80 which they are adapted to abut upon upward movement of the handle 50 to pivot the bellcranks around the pivot pins 94 and 96. The vertical legs of the bellcranks have pivoted thereto, as at 102 and 104, a pair of pawls 106 and 108 which are appropriately guided for inward and outward movement relative to the file by the L-shaped guides 64. When the pawls move inwardly of the frame, they will engage one of the teeth of the saw 74 to move the latter within the slot 62 across the base member as will appear from the description of the operation of the device hereinafter. The pawls are urged outwardly of the frame and out of engagement with the saw teeth by means of coil springs 110 and 112 which are terminally secured, as shown clearly in Figure 3, to the respective pawls 106 and 108 and to the L-shaped guides 64.

In practical operation, the file 60 is set at the desired angle to cut the saw by means of the set screw 61 (Figure 3). Thereafter, the plate 18 is set at the desired angle relative to the base member by means of the headed bolt 20 and nut 22. After the proper adjustments of the set screw 88 and the set screws 98 and 100 are made, the saw 74 is slidably mounted on the base member to extend through the slot 62. The handle 50 is then moved longitudinally inwardly and outwardly of the base member so that the file engages one of the teeth on the saw. Thereafter, the handle is raised so that the platform 80 strikes the set screw 100 and pivots the bellcrank 92 so that the pawl 108 moves inwardly of the frame and engages a saw tooth to move the saw in a stepwise direction across the base member, whereupon the file is again lowered and reciprocated over the saw to file another tooth. This procedure is repeated until all of the teeth on the saw have been filed and the saw has been moved completely across the base member. In this actuation, it will be noted that the slot 82 on the platform 80 clears the set screw 98 in which case the pawl 106 is not actuated to move inwardly or outwardly of the frame, and only the pawl 108 is actuated. To move the saw in a reverse direction across the base member to complete the filing of the teeth on the saw, the bar 18 is angularly adjusted again on the base member so that the platform 80 is in such a position that it can engage the screw 98 upon upward movement of the handle, but clear the screw 100. In this position, an upward movement of the handle will this time actuate the pawl 106 to engage the saw teeth and move the saw in a reverse direction across the base member while the other pawl 108 remains unactuated.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A manually operable saw holder and filer comprising, in combination, a relatively stationary horizontal base plate having a saw accommodating and exposing slot therein, means carried beneath said base plate adapted to slidably support a saw in an operative position in said saw slot, a vertical arched frame fixed to and rising vertically from said base plate in alignment with said saw slot, a vertical bearing fixed to the median portion of said arched frame and directly above said saw slot, a vertical shaft adjustably mounted in said bearing, a plate in a plane with and pivotally mounted for adjustment on said base plate, a guide rod mounted for shiftable reciprocation on and above said plate, a bar having handle means, said bar being slidably joined to said vertical shaft, means for mounting a file on said bar, means pivotally securing one end of said bar to said rod, adjustable means for limiting the upward lifting swing of said bar, said plate, rod, bar and last means all being swingable in a common plane about the pivotal connection between the plate and said base member.

2. The structure defined in claim 1, said shaft being in alignment with and perpendicular to said bar and having a fork at its lower end, said bar having guided and retained connection with said fork.

3. The structure defined in claim 1, and longitudinally spaced file holding collars adjustably suspended from said bar.

4. The structure defined in claim 1, and a sleeve mounted for rotation in said bearing, said sleeve serving as a bushing and said shaft being slidable and rotatable in said sleeve, and regulable adjusting and stop means on the upper end of said shaft engageable with said sleeve.

5. A manually operable saw holder and filer comprising, in combination, a relatively stationary horizontal base plate having a saw accommodating and exposing slot therein, having an additional arcuate slot with a cooperating graduated scale, a horizontal plate in a plane with said base plate and having bolt and nut connection at one end with said arcuate slot, said plate being provided with longitudinally spaced bearing lugs, a rod in parallelism above said plate and slidable in said bearing lugs, a clamp adjustably attached to the intermediate portion of said rod between said bearing lugs, a relatively fixed vertical bearing supported above the saw accommodating slot in said base plate, a sleeve mounted for rotation in said bearing, frame means integral with said sleeve and second named plate respectively, a vertical shaft rotatable and slidable in said sleeve, a horizontal bar having handle means at one end, having its opposite end pivotally connected with said clamp, and means carried by said bar for supporting a file therebeneath.

6. The structure specified in claim 2 and bellcranks pivotally mounted on the vertical members of said arched frame, spring biased pawls operatively connected with their respective bellcranks, actuating screws carried by said bellcranks, and an operating plate carried by said fork and vertically movable in the path of operation of the respective screws.

7. A manually operable saw holder and filer comprising, in combination, a relatively stationary horizontal base plate having a saw accommodating and exposing slot therein, means carried beneath said base plate and adapted to slidably support a saw in operative position in said saw slot, a vertical arched frame of inverted U-shaped form having a bight portion and depending arm portions, the latter being attached to said base plate, a vertical bearing fixed to the central part of the bight portion of said frame, said bearing being located above said saw slot, a sleeve mounted for adjustment in said bearing, a shaft slidably rotatable in said sleeve, said shaft having a screw-threaded upper end with nut means engaging the adjacent end of said sleeve for adjusting the operation of the shaft in relation to the sleeve, said shaft being provided at its lower end with a fork, an angling plate in a plane with said base plate and adjustably connected at one end to the base plate, a guide rod slidably mounted on said angling plate, frame means connected with said angling plate and with said sleeve and having horizontal frame members extending from the sleeve through the arched frame, a stop screw mounted on said last named frame members, a file carriage embodying a bar member disposed in parallelism above the base plate and angling plate and having its intermediate portion connected to the fork on the lower end of said shaft and having a handle at one end in front of the arched frame and having its opposite end extending through the arch and pivotally connected to an intermediate portion of said guide rod, and means adjustably suspended from said bar member to suspend a file in operating position.

DANIEL B. McCAULLEY.

REFERENCES CITED

The following references are of record in the file of this patent:

UNITED STATES PATENTS

| Number | Name | Date |
| --- | --- | --- |
| 1,224,293 | Foley | May 1, 1917 |
| 1,486,851 | Baldwin | Mar. 18, 1924 |
| 1,666,087 | Collier | Apr. 17, 1928 |
| 1,678,279 | Branch et al. | July 24, 1928 |
| 1,728,393 | Collier | Sept. 17, 1929 |
| 1,748,394 | Purfield | Feb. 25, 1930 |
| 1,832,224 | Klunk | Nov. 17, 1931 |
| 2,019,330 | Altman | Oct. 29, 1935 |
| 2,245,984 | Knowles | June 17, 1941 |
| 2,267,553 | Dale | Dec. 23, 1941 |